United States Patent [19]

Jahnke

[11] 3,769,656

[45] Nov. 6, 1973

[54] LUNG AND KIDNEY REMOVAL DEVICE

[76] Inventor: Donald E. Jahnke, 6116 N. 115th St., Menomonee Falls, Wis. 53051

[22] Filed: Feb. 9, 1972

[21] Appl. No.: 224,824

[52] U.S. Cl. ................................................. 17/11
[51] Int. Cl. ............................................ A22c 21/00
[58] Field of Search ......................................... 17/11

[56] References Cited
UNITED STATES PATENTS 3,116,513   1/1964   Ine ......................................... 17/11

*Primary Examiner*—Robert Peshock
*Attorney*—Ronald E. Barry

[57] ABSTRACT

A poultry lung and kidney removal device including a vacuum tube, a pressure actuated vacuum valve for controlling the vacuum in the vacuum tube, a trigger actuated air pressure control valve assembly operatively connected to control the vacuum valve and an automatic lubricating system for lubricating the vacuum valve each time the valve is closed.

11 Claims, 4 Drawing Figures

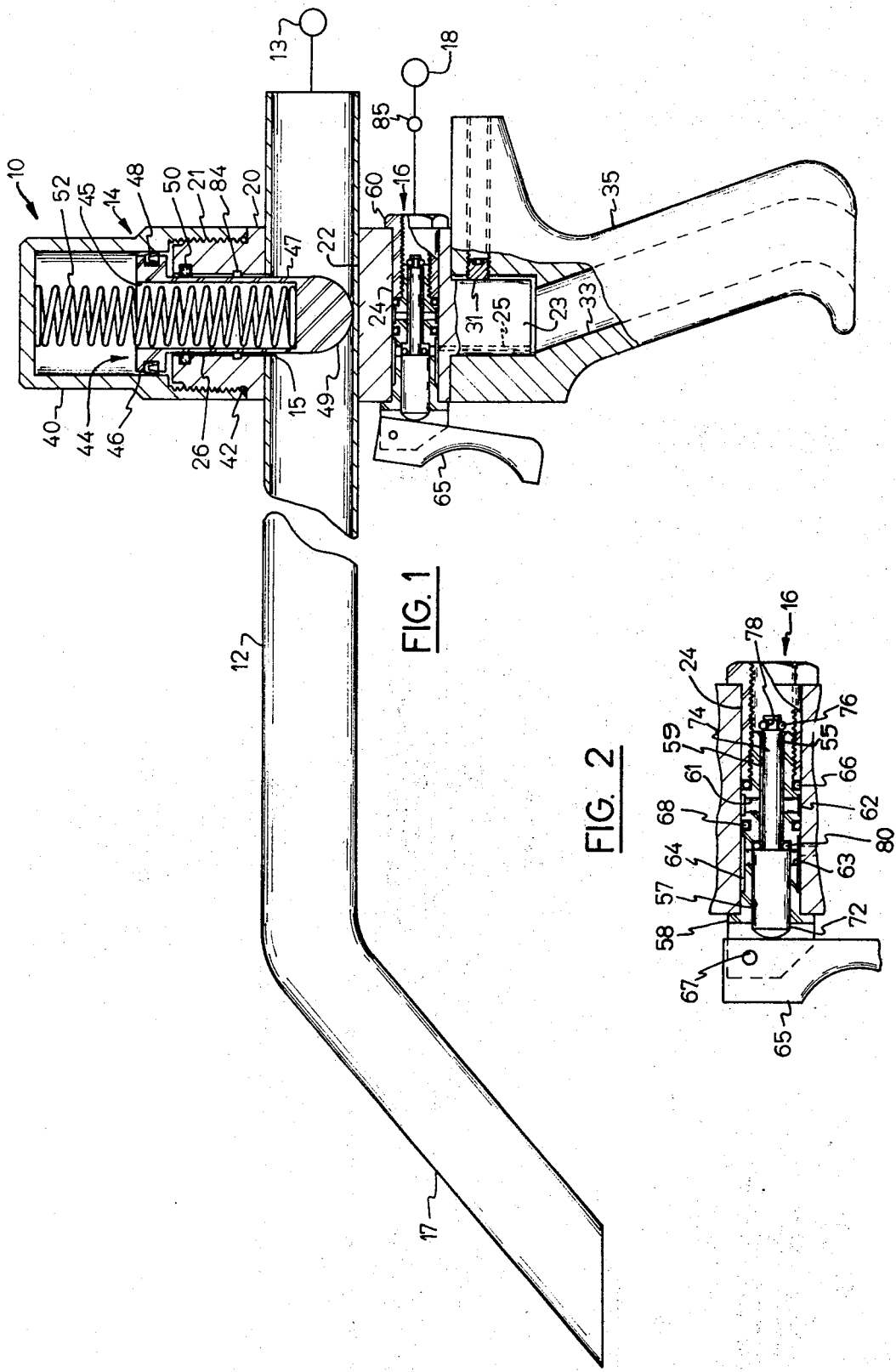

LUNG AND KIDNEY REMOVAL DEVICE

BACKGROUND OF THE INVENTION

Lung and kidney removal vacuum devices are conventionally used to remove the lung and kidneys of poultry as the poultry is transported along a conveyor system. Generally, the conveyor moves at a speed of 25 to 50 birds a minute. At this speed the operator must continually actuate the vacuum control valve a corresponding number of times each minute. These vacuum devices require the application of an operating force of approximately 3 to 5 pounds through a distance of ½ inch or more each time the devices is actuated. Experience has shown that the operator can maintain this speed for periods of approximately 10 minutes before hand and finger fatigue causes the operator to slow down with a corresponding slowdown in the operation of the conveyor. Many of these vacuum devices have complicated control valve assemblies which require additional cleaning time in order to meet USDA approval resulting in a further shut down in the operation of the conveyor.

SUMMARY OF THE INVENTION

The poultry lung and kidney removal devices of the present invention eliminates hand or finger fatigue by using air under pressure to actuate the vacuum control valve. A minimum amount of force and movement is required to actuate the valve and air under pressure is used to open the piston type vacuum valve. The vacuum valve is automatically closed on release of the air control valve and the air discharged from the vacuum valve is directed against the outer surface of the piston rod. This air contains lubricating oil which is automatically deposited on the piston rod.

DRAWINGS

FIG. 1 is a side view in section showing the vacuum device of the present invention;

FIG. 2 is an enlarged view of the air control valve;

DESCRIPTION OF THE INVENTION

The air actuated vacuum device 10 of the present invention generally includes a vacuum tube 12 which is adapted to be connected to a vacuum source schematically shown at 13 and a vacuum control valve assembly 14 for controlling vacuum in the tube 12. The control valve assembly 14 is opened by air under pressure admitted by means of a trigger actuated air valve assembly 16 which is connected to a pressurized air source schematically shown at 18. On actuation of the air valve assembly 16 air under pressure will enter the valve assembly 14 and open the vacuum tube 12. As will be pointed out more clearly hereinafter, the operation of the air valve assembly 16 only requires a finger movement of a fraction of an inch and little or no operating force. The operator will then be able to operate the vacuum nozzle device 10 for long periods of time without experiencing any hand or finger fatigue.

Figure 4:
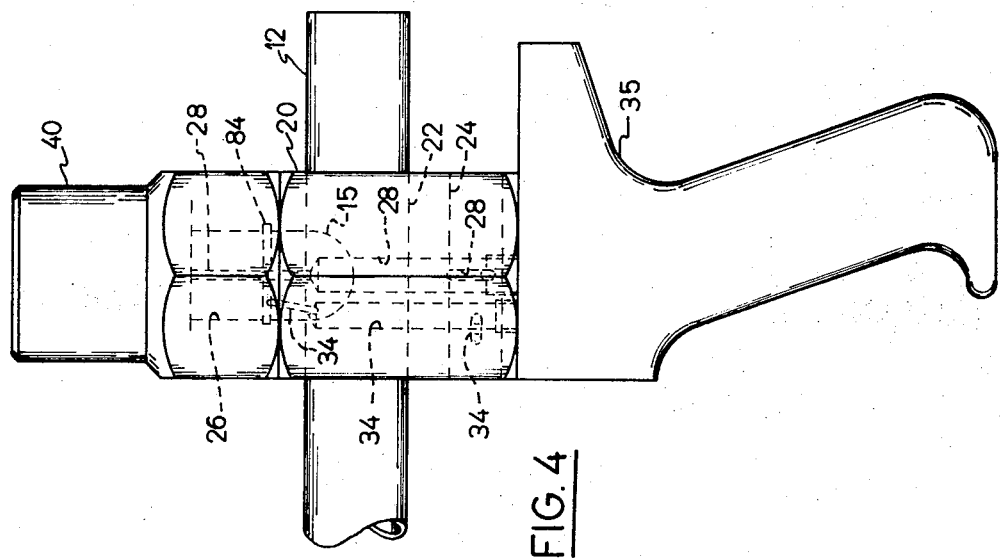
FIG. 4 is a side view in elevation showing the air passages between the air control valve and the vacuum valve.
Figure 3:
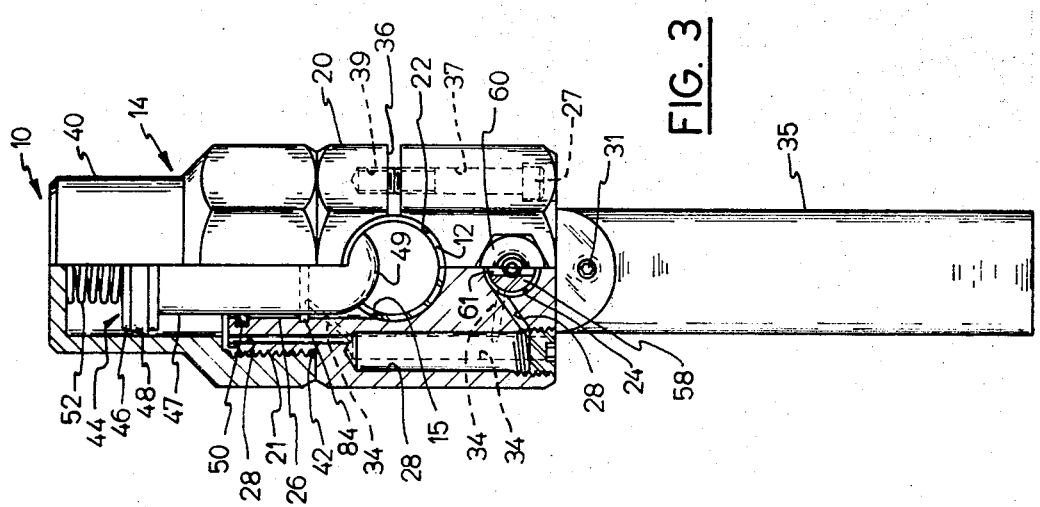
FIG. 3 is an end view of the vacuum nozzle device with a portion of the control valve broken away to show the air passage.

More particularly, the device 10 includes a housing 20 having a threaded extension 21 and a boss 23 having a vent passage 25. The housing 20 is provided with a first passage 22 for the vacuum tube 12, a second passage 24 for the air valve assembly 16 and a third passage 26 for the control valve assembly 14. The second passage 24 is operatively connected to the control valve assembly 14 by means of a series of ports 28 as seen in FIGS. 3 and 4 and is operatively connected to the third passage 26 by means of a series of ports 34. The housing 20 is split at 36 (FIG. 3) and is provided with a bolt hole 37 in a threaded bore 39 coaxial therewith.

The vacuum tube 12 includes an opening 15 and a nozzle section 17. The tube 12 is positioned in the first passage 22 with the opening 15 aligned with the third passage 26. The tube 12 is locked in the first passage 22 by means of a bolt 27 which extends through the bolt hole 37 and is threadedly received in the threaded bore 39. Tightening of the bolt 27 will squeeze the housing against the tube 12. A handle 35 having a central bore 33 is mounted on the boss 23 and is secured thereto by means of a set screw 31.

Control Valve Assembly

Means are provided for controlling the vacuum in the tube 12 in the form of the control valve assembly 14. In this regard, assembly 14 includes a threaded cylinder body 40 threadedly received on the threaded extension 21. The cylinder body 40 is sealed to the housing body 20 by means of an O-ring seal 42. A piston 44 having a central bore 45 is positioned within a third passage 26 and extends into the vacuum tube 12. The piston 44 includes a piston rod 47 and a piston head 46. The head 46 is sealed in the cylinder body 40 by means of a piston cup seal ring 48. The piston rod 47 is sealed in the passage 26 by means of an O-ring seal 50. It should be noted that the piston rod 47 has substantially the same diameter as the vacuum tube 12 and is provided with an arcuate end 49 having the same curvature as the tube 12. The piston 44 is biased to a closed position with respect to the vacuum tube 12 by means of a spring 52 positioned within the bore 45 and extending upward into engagement with the cylinder body 40.

The vacuum tube 12 is opened by admitting air under pressure into the cylinder body 40 through the series of ports 28. The air under pressure, as it enters the body 40 will act against the piston head 46 pulling the piston rod 47 out of the vacuum tube 12 and compressing the spring 52.

The vacuum tube 12 is closed by venting the cylinder body 40 either to atmosphere or to the vacuum tube 12 through ports 28. It should be noted that on venting the cylinder body 40 to atmosphere, the bias of the compressed spring 52 will push the piston rod 47 into the vacuum tube 12.

The Trigger Actuated Air Valve Assembly

Means are provided for actuacting the valve assembly 14 in the form of the trigger actuated air valve assembly 16. The assembly 16 includes an air valve body 58 which is retained in the passage 26 by means of an air valve coupling 60 threadedly received on the end of the valve body 58. The valve body 58 includes a central passage 59 having an inlet 55 at one end and a discharge counterbore 57 at the other end, an annular air groove 62 connected to the passage 59 by ports 61 and an annular discharge groove 64 connected to the counterbore 57 by ports 63. The valve body 58 is sealed within the passage 26 by means of O-ring seals 66 and 68 provided on each side of the air groove 62.

The flow of air through the central passage 59 and the valve body 58 is controlled by means of an air valve 72 having a stem 74. The valve 72 is positioned in the counterbore 57. The stem 74 extends through the passage 59. The passage 59 is closed at the inlet end by means of an O-ring seal 76 provided in a groove 78 on the end of the stem 74. The discharge end of the passage 59 is sealed by means of a second O-ring seal 80 provided on the end of the valve 72.

The valve 72 is moved axially in the passage 59 by means of a trigger 65. In this regard, trigger 65 is pivotally mounted on a pin 67 provided on the valve body 58. The operator merely grasps the handle 35 and squeezes the trigger 65 to electively connect the air groove 62 to the inlet 55 or the discharge end 57 of the passage 59.

In the position shown in FIG. 1, the valve 72 is shown in the closed position in the passage 59 with the O-ring seal 76 seated in the end of the passage 59. The valve 72 is held in the closed position by the force of the air under pressure acting on the end of the stem 74. The ports 28 are then in communication with the groove 62, ports 61 and passage 59. Air in the cylinder body 40 can be vented to atmosphere through the central passage 59, ports 63, groove 64 and vent passage 25.

To open the vacuum tube, the trigger 65 is squeezed to move the valve 72 to the position shown in FIG. 2. The O-ring 76 will be spaced from the end of the passage 59 and the O-ring 80 will be seated against the other end of the passage 59. Air under pressure will pass through the passage 59 and ports 61 to the groove 62 and into the cylinder body 40 through ports 28. Piston 44 will move upward in the cylinder body 40 against the bias of the spring 52 to open the vacuum tube.

The vacuum tube 12 is automatically closed on release of the trigger 65 due to the force of the air under pressure acting on the end of the stem 74. The valve 72 will move to the left closing the passage 59. Air from the cylinder body 40 will pass through the ports 28 into the groove 62 for discharge to the atmosphere through ports 61, passage 59, ports 63, groove 64 and vent passage 25.

Automatic Lubrication

The piston rod 45 can be lubricated with oil each time the valve is actuated by means of the ports 34 and an annular groove 84 provided in the passage 26. In this regard, an inline oiler 85 schematically shown in FIG. 1 can be provided in the air line to the air control valve assembly 16. Air discharged from the cylinder body 40 passes into the groove 84 and completely encircles the piston rod 47. Since the groove 84 is located below the seal 50, the air will pass through the passage 26 into the vacuum tube 12. Any oil carried by the air into the groove 84 will be deposited on the outer surface of the piston rod 45 providing for continuous lubrication of the control valve.

It should be understood that the vent passage 25 is either eliminated or plugged if automatic lubrication is provided.

Disassembly

The poultry lung and kidney removal device 10 of this invention is designed for quick disassembly and reassembly to minimize shutdown time. In this regard, the only parts that require cleaning are the vacuum tube 12, piston rod 47 and passage 26. The piston 44 is easily removed by merely unscrewing and removing the cylinder body 40. The vacuum tube 12 is removed by loosening bolt 27. The vacuum tube 12, piston 44 and housing 20 can then be cleaned and just as easily reassembled.

I claim:

1. A poultry lung and kidney removal device comprising a housing,
   a source of vacuum,
   a vacuum tube supported in said housing, said tube being connected to said vacuum source at one end and having a nozzle section at the other end,
   an air pressure actuated vacuum valve mounted on said housing for controlling the vacuum in said tube, said vacuum valve including a piston and a piston rod positioned for movement to a blocking position in said vacuum tube,
   a source of air under pressure,
   a trigger actuated air valve mounted in said housing and being connected to said vacuum valve and to said source of air under pressure, for selectively applying air under pressure to said vacuum valve to open said valve and draw a vacuum in said tube,
   and means for biasing said piston and rod to the blocking position in said vacuum tube.

2. The device according to claim 1 wherein said air valve includes a valve body having a central passage, said central passage having an air inlet at one end connected to the source of air under pressure, and a discharge outlet at the other end, an annular air groove in the outer surface of said valve body connected to said central passage and to said vacuum valve and a valve stem within said central passage for selectively connecting said air groove to said air inlet or to said discharge outlet.

3. The device according to claim 2 wherein said source of air includes an inline oiler means and said valve body includes a discharge groove connected to vent oil laden air discharged from said central passage to the surface of said piston rod.

4. The device according to claim 2 wherein said valve stem includes a first seal for sealing the inlet to the central passage and a second seal for sealing the discharge end of the central passage.

5. A poultry lung and kidney removal vacuum device comprising a housing,
   a vacuum source,
   a vacuum tube connected to said vacuum source and mounted in said housing,
   a nozzle section on one end of said vacuum tube for removing the lung and kidney from poultry,
   a piston actuated valve mounted on said housing and being responsive to air pressure for controlling the vacuum in said vacuum tube,
   a source of air under pressure,
   and a trigger actuated air pressure control valve in said housing for selectively connecting said source of air pressure to said piston actuated valve.

6. The device according to claim 5 wherein said piston actuated valve comprises a cylinder body mounted on said housing and having a cylinder therein, a piston having a piston head mounted in said cylinder and a piston rod connected to said piston for movement to a blocking position in said vacuum tube.

7. The device according to claim 6 including a first series of ports in said housing connecting said control valve to said cylinder in said cylinder body, said control valve including a valve body having a central passage adapted to be connected to a source of air under pressure and a valve positioned in said passage for selectively connecting said central passage to said ports to pressurize said piston.

8. A poultry lung and kidney removal vacuum device comprising a housing having first, second and third air passages, a vacuum tube mounted in said first passage and being in communication with said third passage, a piston actuated control valve mounted on said housing and including a piston rod mounted for movement into said third passage for controlling the vacuum in said vacuum tube, an air pressure control valve mounted in said second passage, and a first series of ports connecting said second passage to said control valve whereby opening of said control valve connects said second passage to said third passage and actuates said pressure actuated control valve.

9. The device according to claim 8 wherein said air pressure control valve includes a valve body having a central passage, said central passage having an inlet at one end connected to a source of air under pressure, and a valve having a valve stem positioned in said central passage, a first seal on the end of said valve stem positioned to close said central passage and a trigger pivotally mounted on said valve body in a position to engage said valve, whereby on movement of said trigger against said valve said valve stem will be moved in said central passage to an open position with respect to said central passage.

10. The device according to claim 8 wherein said housing includes a first series of ports connecting said third passage to said piston actuated control valve and a second series of ports connecting said second passage to said third passage.

11. The device according to claim 10 wherein said air pressure control valve includes a valve stem having a first seal for controlling air pressure to said first series of ports and a second seal for controlling the flow of air from said first series of ports to said second series of ports.

* * * * *